United States Patent [19]
Donovan

[11] Patent Number: 5,594,846
[45] Date of Patent: Jan. 14, 1997

[54] PERSPECTIVE CORRECTION OF TEXTURE IN GRAPHICS BY ADAPTIVE APPROXIMATION

[75] Inventor: Walter E. Donovan, Milpitas, Calif.

[73] Assignee: Sun Microsystems, Inc., Mountain View, Calif.

[21] Appl. No.: 358,284

[22] Filed: Dec. 19, 1994

[51] Int. Cl.⁶ .................................................. G06T 15/00
[52] U.S. Cl. ............................................ 395/130; 395/125
[58] Field of Search ................................. 395/123–125, 395/129–130

[56] References Cited

U.S. PATENT DOCUMENTS

| | | | |
|---|---|---|---|
| 5,097,427 | 3/1992 | Lathrop et al. | 395/130 |
| 5,307,450 | 4/1994 | Grossman | 395/123 |

OTHER PUBLICATIONS

Williams, *Pyramidal Parametrics*, Computer Graphics, SIGGRAPH '83, vol. 17, n3, pp. 2–12, Jul. 83.
Hierarchical Texture Synthesis on 3–D Surfaces by C. Bennis and A. Gagalowicz; Eurographics '89 pp. 257–268.
Digital Image Warping, by George Wolberg, Department of Computer Sience, Columbia University, N.Y. ISBNO–8186–8944–7(case), ISBN 0–8186–5944–0 (microfiche), pp. 189–204.

*Primary Examiner*—Heather R. Herndon
*Assistant Examiner*—Rudolph Buchel
*Attorney, Agent, or Firm*—Kang S. Lim

[57] ABSTRACT

A computer graphics system includes a texel value generator capably of generating texel values using a minimal amount of computationally intensive divisions while maintaining a selectable texel accuracy criteria along a scan line. This is accomplished by adaptively selecting divisional points which delineate the scan line segments along each scan line such that the divisional points are as widely spaced as possible without exceeding the selected texel accuracy criteria. Having selected the texel accuracy criteria, such as a texel error bound optimally spaced, divisional points along the scan lines are selected as a function of the selected accuracy criteria. In general, since texture gradients are not evenly distributed over the surface of a given object and texture variations are present between different objects of the image, it is advantageous to adaptively select division points one at a time, skipping as many pixels in between divisional points as the local texture gradient will allow. Accurate texel values are computed at these divisional points and also at the end points of the scan line. Approximate texel values are then computed for the pixels located between adjacent pair of divisional points along the scan line using a suitable scheme such as linear interpolation.

36 Claims, 8 Drawing Sheets

FIG. 6

PERSPECTIVE CORRECTION OF TEXTURE IN GRAPHICS BY ADAPTIVE APPROXIMATION

RELATED APPLICATIONS

The application is related to U.S. patent application Ser. No. 08/041,073, filed Apr. 1, 1994, now abandoned and continuation application Ser. No. 08/592,285, entitled "A Method and Apparatus for a Adaptive Textural Mapping Controller", by Yakov Kamen and Uma Sabada, and assigned to Sun Microsystems Inc., incorporated by reference herein to supplement the background discussion.

BACKGROUND OF THE INVENTION

1. Field of the Invention

This invention relates to the field of computer graphics. More particularly, the present invention relates to the field of texture mapping by approximation.

2. Description of the Related Art

The above mentioned pending application includes a general background discussion on computer graphics and texture mapping. As such, this background section will focus on conventional texture mapping with perspective correction, methods for implementing the same, and their disadvantages.

Most conventional computer graphics systems include a display device for displaying a two dimensional image represented as a bit mapped array of evenly spaced pixels. Each pixel has a pixel value and is uniquely identified by an X-axis and a Y-axis coordinate value pair. This Cartesian X-Y coordinate representation is compatible with the majority of graphics display devices whose images are composed of a plurality of scan lines along the X-axis, e.g., cathode ray tubes (CRTs) and active/passive liquid crystal displays (LCDs).

Conventionally, texture is defined as a modulation of color, intensity, surface normal, transparency or other surface property applied to a surface of a graphics object in such a way that the pattern appears attached to the surface as the viewpoint and perspective varies. In order to realistically display three dimensional objects in a high quality two dimensional image on the display device, a perspectively correct texture mapping value, called a texel value, is generated for each pixel to modify the pixel values of the image.

Mathematical models have been employed to provide excellent image quality but they tend to be computationally intensive and very demanding of the processor on the computer graphics system. Typically, the generation of texel values include two divisional computations or their equivalent for each pixel of the image for computing the perspective correction. As is well known in the computer arts, divisional computations typically take a fairly large number of clock cycles, even when the processor is equipped with hardware dedicated to performing divisional computations. With powerful processors, such as a SPARC based processor, computing two divisions per pixel in real-time is possible but the resulting texture computations will limit the processor's ability to simultaneously support other processes. In the less powerful processors, such as Intel's 80486 SX microprocessor, real-time texture value computations requiring the two divisions per pixel can overwhelm the processor. Hence it is highly desirable to lower the computational requirements for generating a high quality perspectively corrected texture map. Typical conventional approaches reduce the total number of division computations by substituting linear interpolation for pixels at predetermined intervals between accurately computed division points.

Figure 1A:
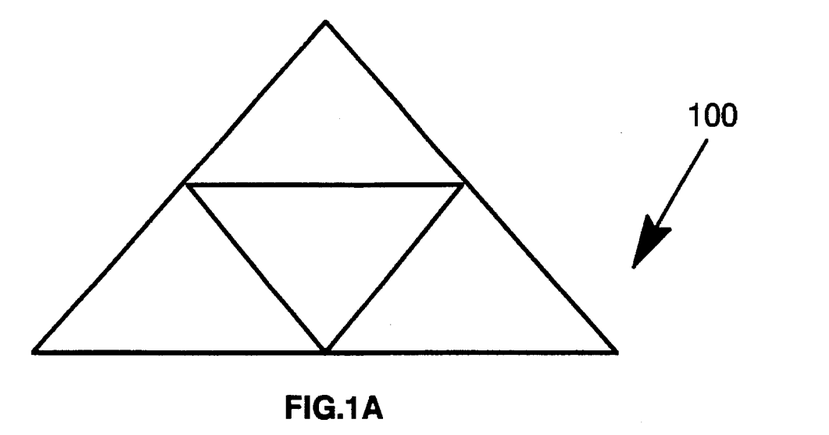
FIGS. 1A and 1B illustrate is a flow chart a conventional method of dividing parent polygon into a pre-determined plurality of child polygons
Figure 1B:
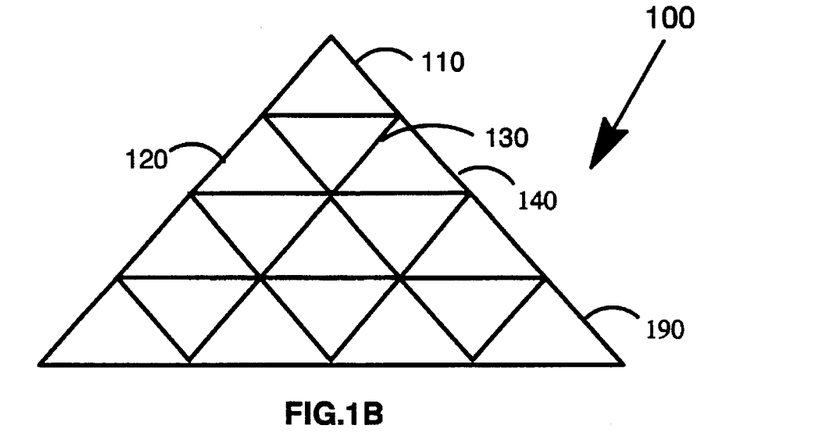
Figure 1C:
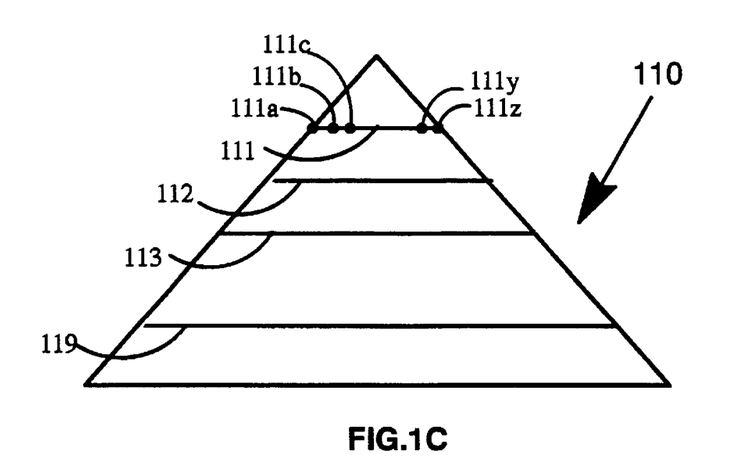
FIG. 1C shows one of the child polygons of FIG. 1B in greater detail.

As shown in FIGS. 1A and 1B, in a first pre-deterministic interpolation method, parent polygon 100 is progressively subdivided in a geometrical manner into a predetermined number of smaller child polygons 110, 120, 130, 140 . . . 190. Referring to FIG. 1C which shows one resulting child polygon 110 in greater detail, accurate texel values are computed for pairs of end points, e.g., end points 111a and 111z, where a scan line 111 intersects the boundaries of child polygon 110. Next, approximate texel values are computed for pixels 111b, 111c . . . 111y located between end points 111a, 111z, by linearly interpolating along scan line 111. This process is repeated for the remaining scan lines 112, 113, . . . 119 of child polygon 110, and also repeated in a similar manner for every scan line of the remaining child polygons 120, 130, . . . 190, until texel values for every pixel within parent polygon 100 have been computed.

Figure 2A:
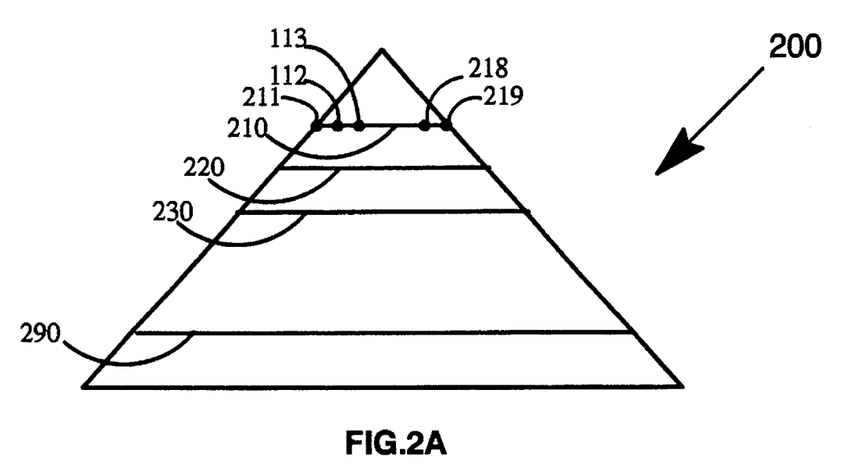
FIGS. 2A and 2B illustrate a conventional method of dividing scan lines of a polygon into groups of contiguous pixels separated by a pre-determined number of divisional points.
Figure 2B:
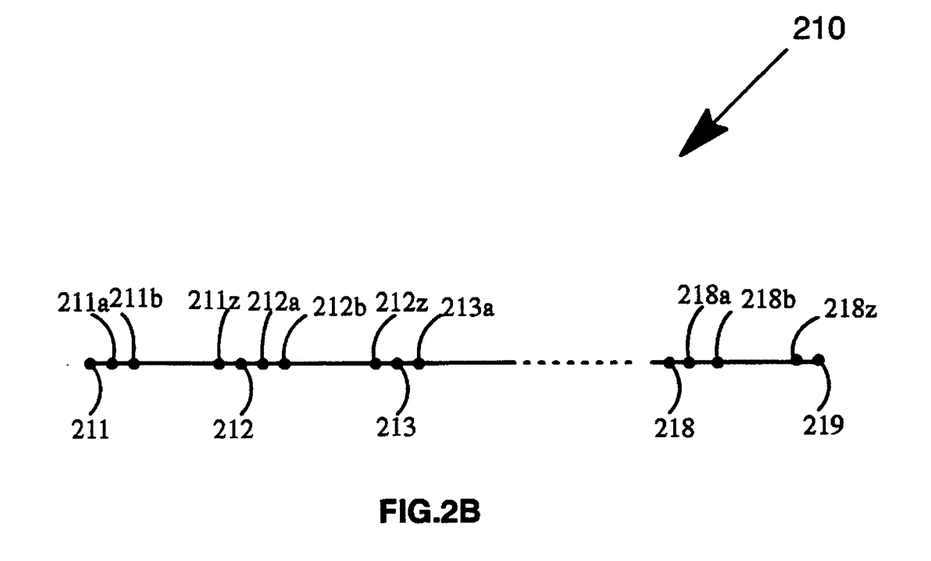

Referring now to FIG. 2A, a second pre-deterministic interpolation method involves subdividing each scan line, e.g., scan line 210 of a polygon 200, into scan line segments delineated by a predetermined number of divisional points 212, 213, . . . 218, and end points 211, 219 as shown. For each scan line, e.g., scan line 210, accurate texel values are computed for end points 211, 219 and divisional points 212, 213, . . . 218. Next, as shown in FIG. 2B, texel values for the remaining pixels, $211a, 211b, \ldots 211z, 212a, 212b \ldots 212z, \ldots, 218a, 218b, \ldots 218z$ along scan line 210 are then computed by linear interpolation. This process is repeated for the remaining scan lines 220, 230, . . . 290, until texel values have been computed for every pixel in polygon 200.

Figure 2C:
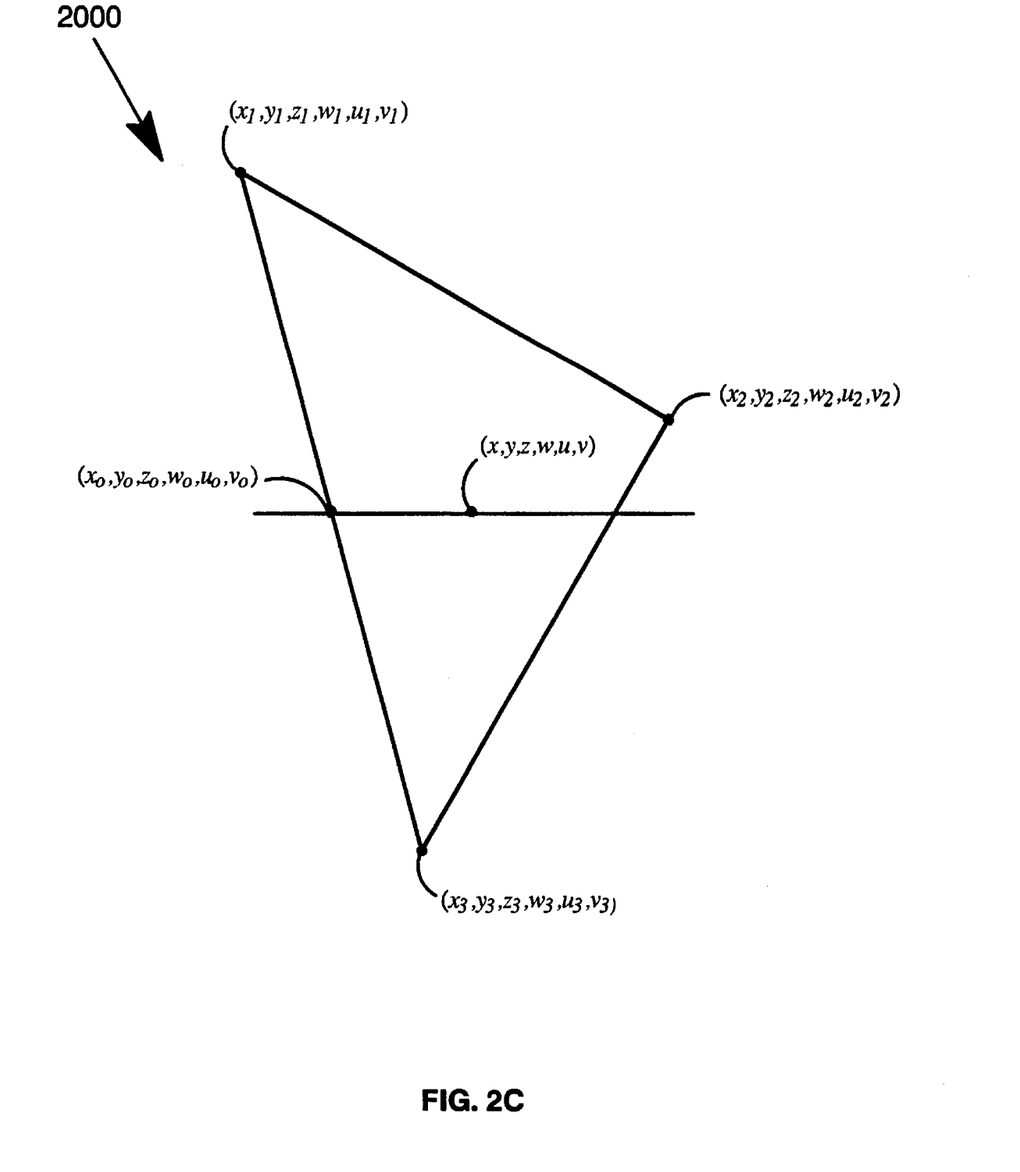
FIG. 2C shows an exemplary triangle for illustrating linear interpolation of intermediate texel values.

In the above described conventional methods, linear interpolation of intermediate texel values can be accomplished with the following exemplary equations as applied to a polygon 2000 of FIG. 2C. Polygon 2000 is a triangle specified by a triple $(x_i, y_i, z_i, w_i, u_i, v_i)$, i=1,2,3, where $(x_i, y_i)$ are the device coordinate of the triangle vertices, $z_i$ are the Z depth at the vertices, $w_i$ are the absolute value of the reciprocals of the w components of the vertices in the homogeneous clip coordinate system, and $(u_i, v_i)$ are the two-dimensional texture coordinates of the vertices. U, V, and W are the respective linearly interpolated values of u, v, w, along the left edge of triangle 2000 between $(x_1,y_1,z_1, w_1,u_1,v_1)$ and $(x_3,y_3,z_3, w_3,u_3, v_3)$.

$$u = u_o + (x - x_o)\left(\frac{du}{dx}\right) \quad \text{(EQ i)}$$

$$v = v_o + (x - x_o)\left(\frac{dv}{dx}\right) \quad \text{(EQ ii)}$$

$$w = w_o + (x - x_o)\left(\frac{dw}{dx}\right) \quad \text{(EQ iii)}$$

and $$u_o = U(x_o, y_o) \quad \text{(EQ iv)}$$
$$w_o = W(x_o, y_o) \quad \text{(EQ v)}$$
$$v_o = V(x_o, y_o) \quad \text{(EQ vi)}$$

$$\text{texture} = \text{texmap}\left(\frac{u}{q}, \frac{v}{q}\right) \quad \text{(EQ vii)}$$

While the above described conventional methods do reduce the computational load on the processor by replacing some computationally intensive divisions with simpler linear interpolations, both conventional methods are disadvantageously inflexible, inefficient and/or produce unsatisfactory texel values. This is because pre-determining the amount of divisions works well only if texture variations between objects and texture gradients within objects over the entire image are both fairly constant. In practice, different objects in different images can have different texture properties and so no one predetermined level of scan line division will be optimal for all objects. For example, if the predetermined scan line segments are too short, i.e., the divisional points too closely spaced, an excessive amount of divisional computations will be required of the processor. Conversely, if the predetermined scan line segments are too large, grossly inaccurate approximations of texel values will result at distant pixel locations relative to the divisional points, and the overall texture quality of the image will be poor.

SUMMARY OF THE INVENTION

The present invention provides a computer graphics system with a texel value generator capably of generating texel values using a minimal amount of computationally intensive divisions, i.e., a minimal number of divisional points, while maintaining a selectable texel accuracy criteria along a scan line. This is accomplished by adaptively selecting the divisional point(s) which delineate the scan line segment(s) along each scan line such that the divisional points are as widely spaced as possible without exceeding the selected texel accuracy criteria.

Having selected the texel accuracy criteria, such as a texel error bound, the locations of the divisional points along the scan lines are computed as a function of the selected accuracy criteria. In general, since texture gradients are not evenly distributed over the surface of a given object and texture variations are present between different objects of the image, it is advantageous to adaptively select division points one at a time, skipping as many pixels in between divisional points as the local texture gradient will allow. In other words, the optional number of pixels between any two adjacent divisional points varies in accordance with the local texture gradient.

Once the divisional points between the end points of a scan line have been selected, accurate texel values are computed at these divisional points and also at the end points of the scan line. Typically, two divisions or equivalent mathematical operations such a reciprocal and a multiply computation, are used to accurately computing each texel value. Next, approximate texel values are computed for the pixels located between adjacent pair of divisional points along the scan line. Suitable approximation schemes include interpolation methods such as linear interpolation.

The above described process of selecting divisional points, computing accurate texel values at these divisional points and end points, and then approximating texel values for pixels lying in between adjacent divisional points and/or end points, is repeated for each scan line overlapping the given object until all the pixel texel values for displaying the object have been computed.

DESCRIPTION OF THE DRAWINGS

The objects, features and advantages of the system of the present invention will be apparent from the following description in which.

DEFINITIONS

Pixel: an integral point located on a pre-defined coordinate system, e.g., X-Y coordinate, that has a pixel value associated with an image of a given object to be displayed.

MIP (multum in parvo) map: a pyramidal parametric data structure which allows both intra-level and inter-level trilinear interpolation schemes, e.g., in an [u, v, d] coordinate system, where u, v are spatial coordinates used to access points within a pyramid level, and the d coordinate is used to index and interpolate between the different levels of the pyramid.

Texel value: a texture value for mapping a corresponding pixel value so as to display texture on a given object from a given perspective.

Graphics image: a representation of a given object for display on a graphics display device.

Polygon: a mathematically convenient shaped area of interest on a given object.

DESCRIPTION OF THE PREFERRED EMBODIMENT

In the following description, numerous details provide a thorough understanding of the present invention. These details include functional blocks and exemplary texel accuracy criteria to assist a developer in implementing an efficient adaptive texel value generator in software, hardware or a combination thereof. In addition, while the texel value generator of the present invention is described with reference to a specific implementation, the invention is applicable to a wide variety of computer graphics systems and environments. In other instances, well-known circuits, structures and program code are not described in detail so as not to obscure the invention unnecessarily.

Figure 3:
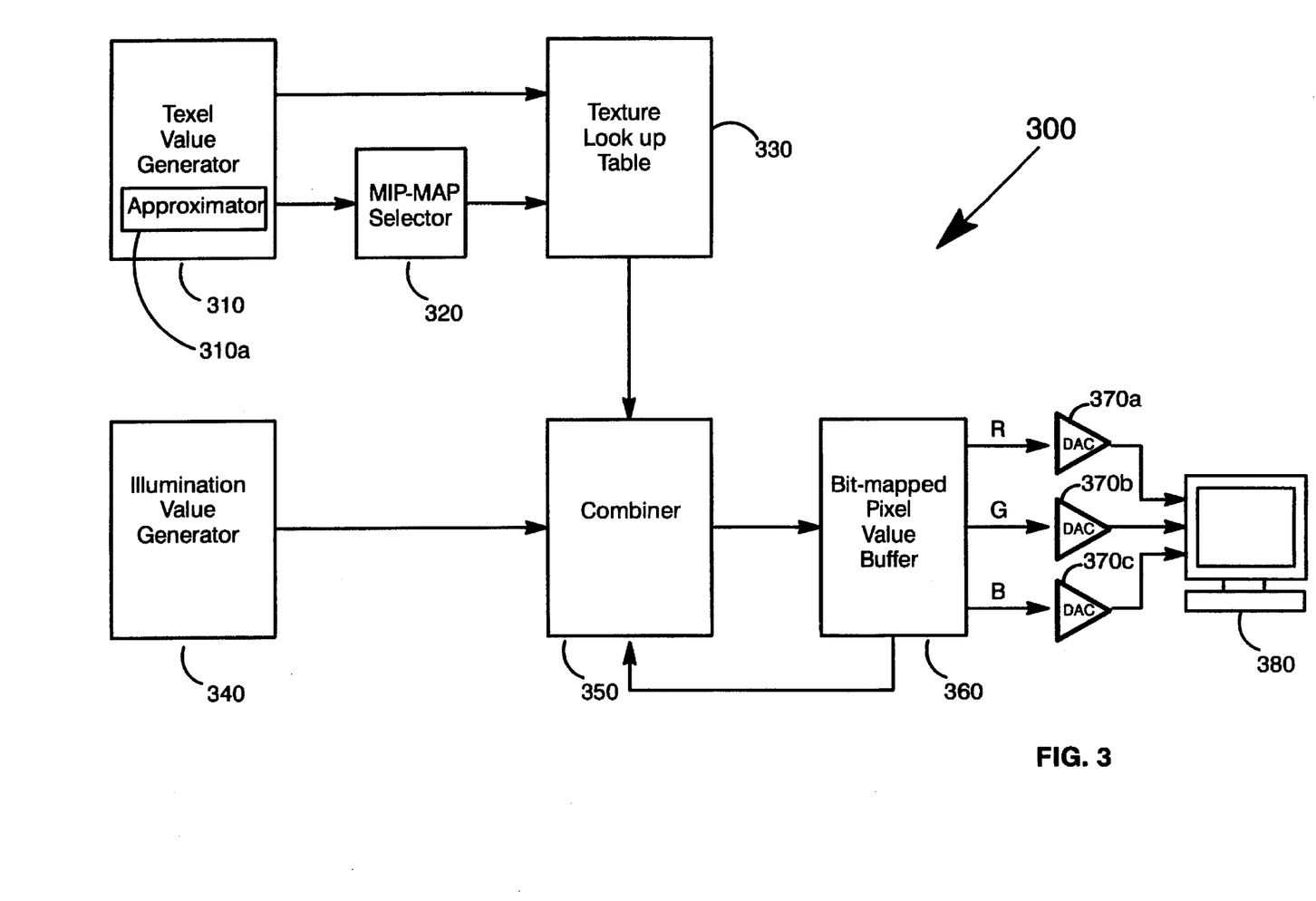
FIG. 3 is a block diagram illustrating a texture mapping system which includes a texel value generator of the present invention.

FIG. 3 is a block diagram illustrating one embodiment of a texture mapping system 300 which includes a texel value generator 310 of the present invention. Texture mapping system 300 also includes a MIP-map selector 320, a texture lookup table 330, an illumination value generator 340, a combiner 350, a bit-mapped pixel value buffer 360, three digital-to-analog converters (DACs) 370*a*, 370*b*, 370*c*, and a display device 380.

Texel value generator 310 is coupled to texture lookup table 330, both directly and through MIP-map selector 320. The respective output nodes of texture lookup table 330 and illumination value generator 340 are coupled to combiner 350. The output node of combiner 350 is coupled to bit-mapped pixel value buffer 360. In turn, pixel value buffer 360 is coupled to the digital input nodes of DACs 370a, 370b, 370c. The analog output nodes of DACs 370a, 370b, 370c are coupled to display device 380.

Texel value generator 310 provides u, v signals and derivative u, v signals to texture lookup table 330 and MIP selector 320, respectively. In turn, MIP selector 320 provides MIP-map select signals to texture lookup table 330. Texture lookup table 330 and illumination value generator 340 produce texture and illumination values, respectively, for combiner 350. Combiner 350 then combines these texture and illumination values, together with feedback pixel values from pixel value buffer 360, and generates composite bit-mapped pixel values for buffer 360. Finally, pixel value buffer 360 provides the respective digital RGB signals, which are convened by DACs 370a, 370b, 370c, into the corresponding analog RBG signals to display device 380.

Figure 4A:
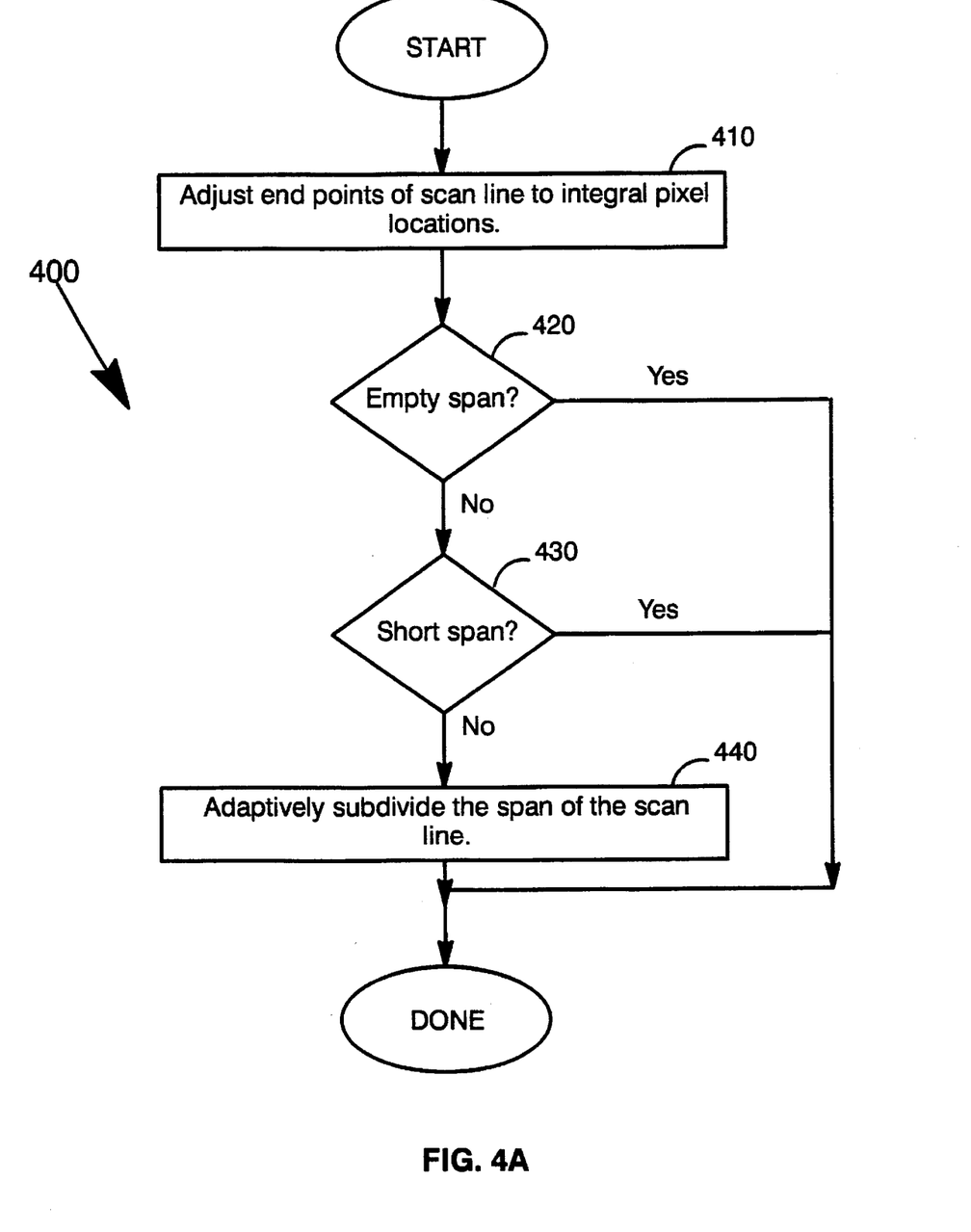
FIGS. 4A and 4B are flow charts illustrating a method for adaptively sub-dividing a scan line in accordance with the invention.
Figure 4B:
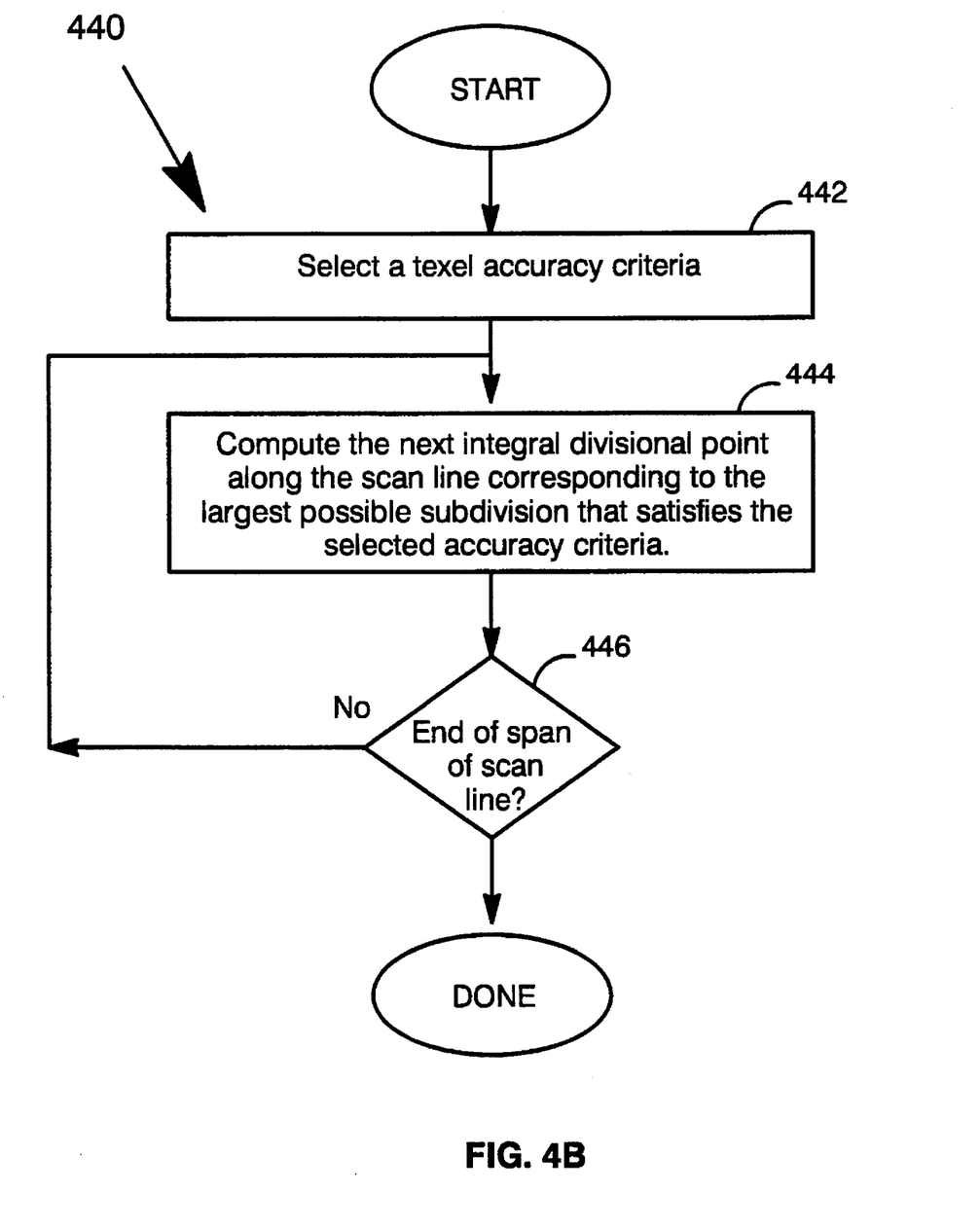

FIGS. 4A and 4B are flow charts illustrating an optimal method for adaptively subdividing a scan line, the method useful in association with texel value generator 310. In one embodiment, in order to be compatible with most conventional graphics display devices, the texel values are generated along parallel scan lines which are bounded by polygons, each of which define an area of interest on a given object. Each scan line has pairs of end points where the scan line intersects the boundary of a polygon. These scan lines are decomposable into rows of pixels at integral locations in an X-Y coordinate system.

Referring to the flowchart of FIG. 4A, first the end points of a scan line are adjusted to integral pixel coordinate locations by a suitable method, such as trucation or rounding up/down (step 410). If the scan line is extremely short, i.e., the span of the scan line is empty because the two integral end points have merged, then no sub-division is required (step 420). Similarly, if the span of the scan line is too short to substantially benefit from any sub-division, no sub-division is performed (step 430).

Conversely, if the span is long enough to substantially benefit from sub-division, texel value generator 310 adaptively sub-divides the span of the scan line into a minimum number of optimally spaced sub-divisions (step 440).

Referring now to the flowchart of FIG. 4B, step 440 is shown in greater detail. First a suitable texel accuracy criteria is selected (step 442). In this embodiment, the texel accuracy criteria is a texel error bound. Starting at one end of the scanline, texel value generator 310 computes the location of the next integral divisional point along the scan line corresponding to the largest possible sub-divisional spacing that satisfies the selected accuracy criteria (step 444). The computation of additional divisional point(s) is repeated along the scan line until the opposite end of scan line is reached (step 446). Appendices A and B, which are unpublished and contained in the file wrapper, show equations and a computer program, respectively, for computing the location of divisional point(s) in the preferred embodiment.

Figure 5:
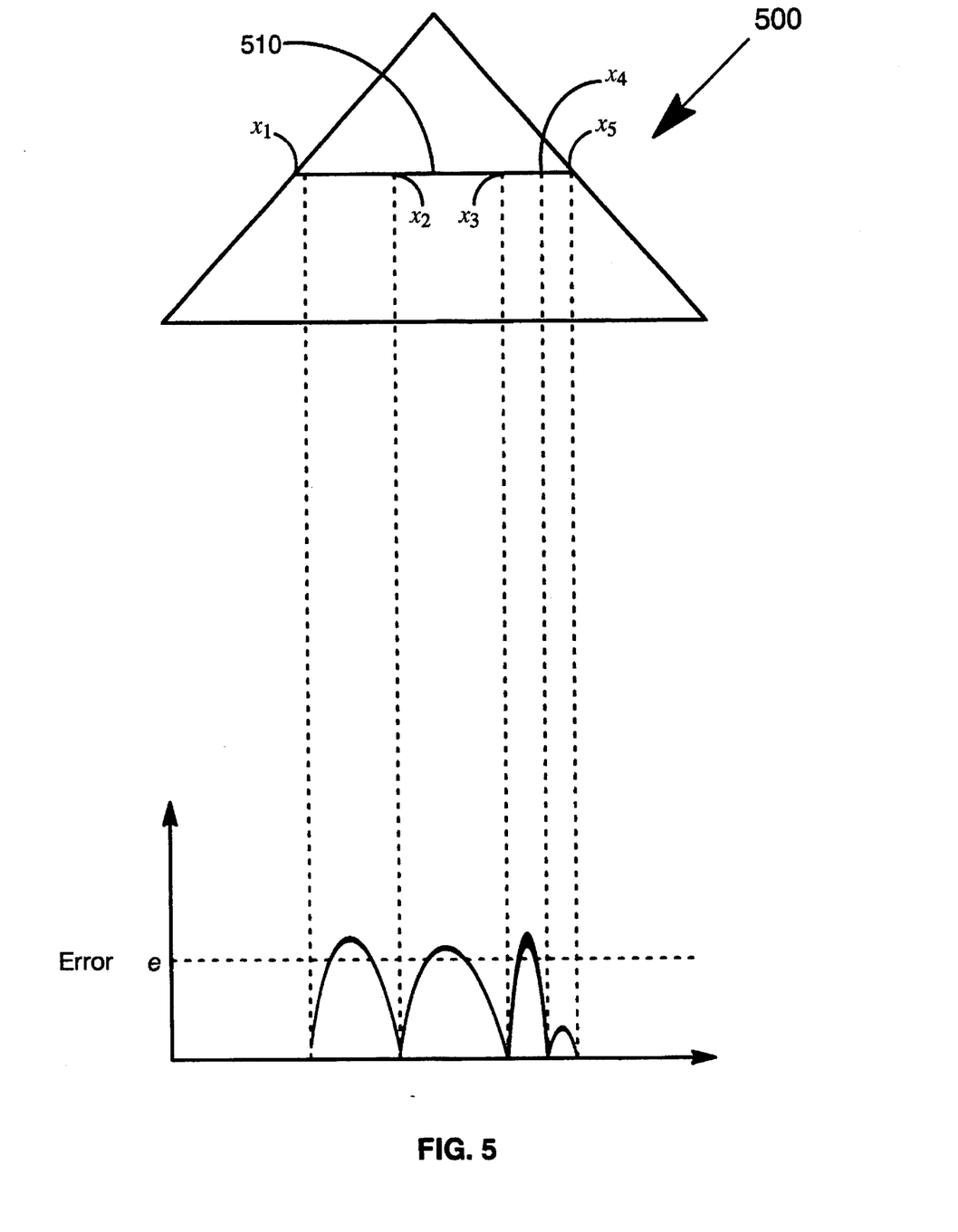
FIG. 5 illustrates a polygon having an optimally subdivided scan line.

FIG. 5 illustrates a polygon 500 having a scan line 510 subdivided by division points $x_2$, $x_3$, $x_4$ and end points $x_1$, $x_5$. In accordance with the preferred embodiment, the error of the approximated texture values increases, reaches a maximum at or approximately at an error bound value e and then decreases between adjacent division/end points. Note that optimizing with respect to an error bound e, may result in uneven spacing as illustrated by end/division point pairs $x_1$ and $x_2$, $x_2$ and $x_3$, $x_3$ and $x_4$, and $x_4$ and $x_5$.

In the preferred embodiment, the spacing t between adjacent divisional points are computed using the following equation:

$$t = e + 2\sqrt{e\frac{wl}{|dw|}} \qquad \text{(EQ viii)}$$

where e=the error bound w=absolute value of the reciprocals of the w components and $$dw = \frac{wr - wl}{xr - xl}$$

where wl=w value at the left divisional point
and wr=w value at the adjacent right divisional point Note that along the span of a scan line, at a given step t, dw and e are constants, and wl changes. One suitable value for e is 0.5, i.e., half a pixel. By selecting e=0.5, each pixel will map to within half a pixel of where it should go. Although magnified texel edges will show an occasional glitch of non-monotonicity, this can easily be corrected by decreasing the selected e value. Conversely, increasing the selected e value increases the probability of glitches since the error bound is increased.

Alternatively, equation viii can be of the form:

$$t = e + 2\sqrt{\frac{e}{|dw|}} \cdot \sqrt{wl} \qquad \text{(EQ ix)}$$

By normalizing w over the polygon, "wl" can be kept in the range [0, 1]. A look up table for a square root function can be used in place of a square root computation. Further efficiency is also possible because $$\sqrt{\frac{e}{|dw|}}$$

is constant over each polygon.

Figure 6:
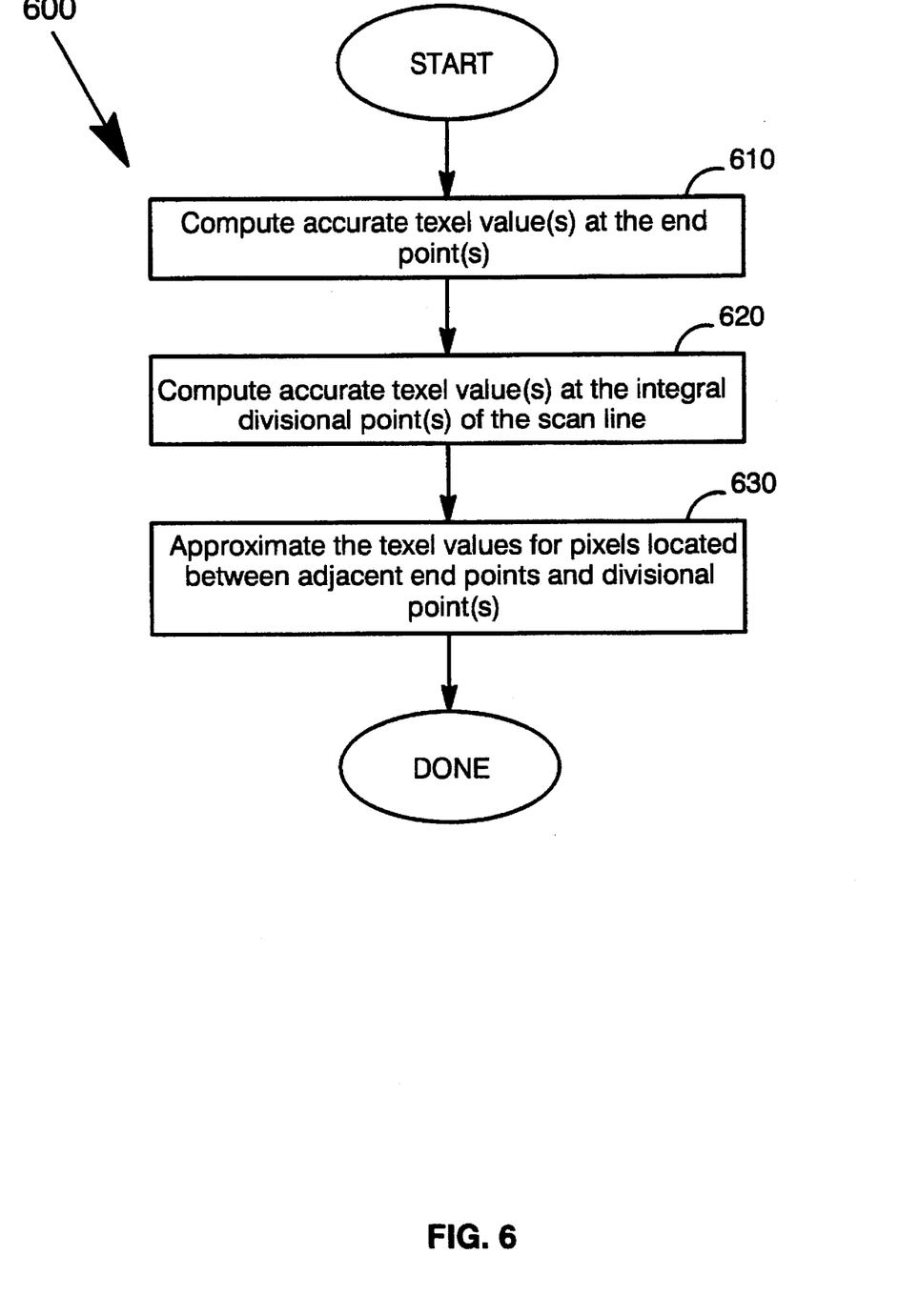
FIG. 6 is a flow chart illustrating a method for approximating texel values while satisfying a selectable texel accuracy criteria.

FIG. 6 is a flow chart illustrating a method for approximating the texel values along the span of the scan line after the divisional point(s), if any, have been selected. First, texel value generator 310 computes accurate texel values at the two integral end points (step 610). Accurate texel values are also computed for the integral divisional point(s), if any, selected in step 444 (step 620). Finally, texel value generator 310 which includes an approximator 310a generates approximate texel values for the intermediate pixels located between adjacent end points and divisional point(s) of each scan line (step 630). Suitable approximation methods include interpolating techniques such as the linear interpolation using the equations EQ (i)–(ix) described above.

In some embodiments, mip map levels are also computed by approximation. Since each of the subdivided line segments defined by adjacent divisional points is affine, the MIP map level is constant across each line segment. Typically, MIP maps are decimated by a factor of 2 in u and v. Hence, MIP map levels can be approximated using the following equation:

$$\text{level} = \frac{1}{2} \log_2 \left( \left( \frac{du}{dx} \right)^2 + \left( \frac{dv}{dx} \right)^2 \right) \quad \text{(EQ x)}$$

While the present invention has been described in conjunction with a preferred embodiment, numerous additions and modifications are possible without departing from the spirit of the invention. Hence, the scope of the invention should be determined by the following claims.

What is claimed is:

1. In a computer graphics system for generating and displaying images of objects on a display device, the images including pixels having pixel values, the graphics system including elements for modifying the images displayed on the display device, a method for efficiently computing texel values so as to display texture on a given object from a given perspective, said method comprising the steps of:

adaptively selecting a plurality of divisional points between a pair of end points along a scan line, said adaptive selection step including the steps of:
selecting a texel accuracy criteria; and
computing the locations of said divisional points located along said scan line as a function of said selected texel accuracy criteria; and approximating a plurality of intermediate texel values for a corresponding plurality of pixels located between adjacent divisional points of said scan line.

2. The method of claim 1 wherein said approximating step includes an interpolating step.

3. The method of claim 2 wherein said interpolating step is a linear interpolating step.

4. The method of claim 1 wherein said texel accuracy criteria is a texel error bound.

5. The method of claim 4 wherein said texel error bound is a constant e, and a step t between adjacent divisional points is computed using an equation:

$$t = e + 2\sqrt{e\frac{wl}{|dw|}}$$

6. The method of claim 1 further comprising the steps of:

approximating a second plurality of intermediate texel values for a second corresponding plurality of pixels located between one of said end points and an adjacent divisional point of said scan line.

7. The method of claim 6 wherein said approximating step includes an interpolating step.

8. The method of claim 7 wherein said interpolating step is a linear interpolating step.

9. The method of claim 1 further comprising the step of:

accurately computing a corresponding plurality of texel values at said divisional points and said end points of said scan line.

10. The method of claim 1 further comprising the step of using said intermediate texel values to modify said pixel values of said pixels.

11. The method of claim 10 wherein said modification of said pixel values includes a step of computing MIP map level values for said intermediate texel values using an equation:

$$\text{level} = \frac{1}{2} \log_2 \left( \left( \frac{du}{dx} \right)^2 + \left( \frac{dv}{dx} \right)^2 \right)$$

12. An adaptive texel value generator useful in association with a computer graphics system for generating, modifying and displaying an image of objects on a display device, the image including pixels having pixel values, said texel value generator comprising:

a calculator for adaptively computing the locations of a plurality of divisional points along a scan line as a function of a selected texel accuracy criteria; and an approximator coupled to said calculator, for computing a plurality of intermediate texel values for a corresponding plurality of pixels located between adjacent divisional points of said scan line.

13. The generator of claim 12 further comprising a memory element coupled to said calculator, for storing said selected texel accuracy criteria.

14. The generator of claim 13 wherein said stored texel accuracy criteria is a texel error bound.

15. The generator of claim 14 wherein said texel error bound is a constant e, and a step t between adjacent divisional points is computed using an equation:

$$t = e + 2\sqrt{e\frac{wl}{|dw|}}$$

16. The generator of claim 12 wherein said approximator includes an interpolator for interpolating between texel values of said adjacent divisional points.

17. The generator of claim 14 wherein said interpolator is a linear interpolator.

18. The generator of claim 12 wherein said calculator includes a divider for accurately computing texel values for said divisional points.

19. The generator of claim 12 wherein said pixel values are modified by computing MIP map levels of said intermediate texel values using an equation:

$$\text{level} = \frac{1}{2} \log_2 \left( \left( \frac{du}{dx} \right)^2 + \left( \frac{dv}{dx} \right)^2 \right)$$

20. A texture mapping system useful in association with a computer graphics system for generating, modifying and displaying an image of objects on a display device, the image including pixels having pixel values, said graphics system comprising:

a calculator for adaptively computing the locations of a plurality of divisional points along a scan line as a function of a selected texel accuracy criteria;

an approximator coupled to said calculator, for computing a plurality of intermediate texel values for a corresponding plurality of pixels located between adjacent divisional points of said scan line; and a combiner coupled to said approximator, for modifying said pixel values with said intermediate texel values.

21. The mapping system of claim 20 further comprising a memory element coupled to said calculator, for storing said selected texel accuracy criteria.

22. The mapping system of claim 21 wherein said stored texel accuracy criteria is a texel error bound.

23. The mapping system of claim 22 wherein said texel error bound is a constant e, and a step t between adjacent divisional points is computed using an equation:

$$t = e + 2\sqrt{e\frac{wl}{|dw|}}$$

24. The mapping system of claim 20 wherein said approximator includes an interpolator for interpolating between texel values of said adjacent divisional points.

25. The mapping system of claim 24 wherein said interpolator is a linear interpolator.

26. The mapping system of claim 20 wherein said calculator includes a divider for accurately computing texel values for said divisional points.

27. The mapping system of claim 20 wherein said pixel values are modified by computing MIP map levels of said intermediate texel values using an equation:

$$\text{level} = \frac{1}{2} \log_2 \left( \left( \frac{du}{dx} \right)^2 + \left( \frac{dv}{dx} \right)^2 \right)$$

28. A computer program product including a computer-usable medium having computer-readable code embodied therein for causing texture of an image to be displayed, the computer program product comprising:
  computer-readable code configured to adaptively select a plurality of divisional points along a scan line by selecting a texel accuracy criteria and computing the locations of said divisional points located along said scan line as a function of said selected texel accuracy criteria; and
  computer-readable code configured to approximate a first plurality of intermediate texel values for a first plurality of pixels located between adjacent divisional points of said scan line.

29. The computer program product of claim 28 wherein said approximation is an interpolation.

30. The computer program product of claim 29 wherein said interpolation is linear.

31. The computer program product of claim 28 wherein said texel accuracy criteria is a texel error bound.

32. The computer program product of claim 31 wherein said texel error bound is a constant e, and a step t between adjacent divisional points is computed using an equation:

$$t = e + 2 \sqrt{e \frac{wl}{|dw|}}$$

33. The computer program product of claim 28 further comprising computer-readable code configured to approximate a second plurality of intermediate texel values for a second plurality of pixels located between an end point and an adjacent divisional point of said scan line.

34. The computer program product of claim 28 further comprising computer-readable code configured to accurately compute a plurality of texel values at said divisional points and said end points of said scan line.

35. The computer program product of claim 28 further comprising computer-readable code configured to use said intermediate texel values to modify said pixel values of said pixels.

36. The computer program product of claim 35 wherein said modification of said pixel values includes a computation of MIP map level values for said intermediate texel values using an equation:

$$\text{level} = \frac{1}{2} \log_2 \left( \left( \frac{du}{dx} \right)^2 + \left( \frac{dv}{dx} \right)^2 \right)$$

* * * * *